(12) United States Patent
Parazynski et al.

(10) Patent No.: US 11,599,107 B2
(45) Date of Patent: Mar. 7, 2023

(54) APPARATUS, METHODS AND SYSTEMS FOR REMOTE OR ONBOARD CONTROL OF FLIGHTS

(71) Applicant: Fluidity Technologies Inc., Houston, TX (US)

(72) Inventors: Scott Edward Parazynski, Houston, TX (US); Jorge Antonio Guerrero, Katy, TX (US); Keith Edwin Brooks, III, Spring, TX (US)

(73) Assignee: Fluidity Technologies Inc., Houston, TX (US)

( * ) Notice: Subject to any disclaimer, the term of this patent is extended or adjusted under 35 U.S.C. 154(b) by 0 days.

(21) Appl. No.: 17/110,576

(22) Filed: Dec. 3, 2020

(65) Prior Publication Data

US 2021/0173391 A1 Jun. 10, 2021

Related U.S. Application Data

(60) Provisional application No. 62/945,339, filed on Dec. 9, 2019.

(51) Int. Cl.
*G05D 1/00* (2006.01)
*G05D 1/10* (2006.01)

(52) U.S. Cl.
CPC ........... *G05D 1/0016* (2013.01); *G05D 1/005* (2013.01); *G05D 1/0072* (2013.01); *G05D 1/101* (2013.01)

(58) Field of Classification Search
CPC .... G05D 1/0016; G05D 1/005; G05D 1/0072; G05D 1/101
See application file for complete search history.

(56) References Cited

U.S. PATENT DOCUMENTS

| | | |
|---|---|---|
| 3,028,126 A | 4/1962 | Holleman |
| 3,260,826 A | 7/1966 | Johnson |
| 3,394,611 A | 7/1968 | Beurrier |
| 4,012,014 A | 3/1977 | Marshall |
| 4,069,720 A | 1/1978 | Thor |
| 4,216,467 A | 8/1980 | Colston |
| 4,306,208 A | 12/1981 | Coors |
| 4,420,808 A | 12/1983 | Diamond et al. |
| 4,533,899 A | 8/1985 | Isaksson |

(Continued)

FOREIGN PATENT DOCUMENTS

| | | |
|---|---|---|
| CN | 1310366 A | 8/2001 |
| CN | 102346498 A | 2/2012 |

(Continued)

OTHER PUBLICATIONS

Office Action for U.S. Appl. No. 13/797,184, dated Mar. 2, 2015, 16 pages.

(Continued)

*Primary Examiner* — Faris S Almatrahi
*Assistant Examiner* — Sahar Motazedi
(74) *Attorney, Agent, or Firm* — Cooley LLP

(57) ABSTRACT

The present disclosure relates generally to control systems, and in particular apparatus, methods, and systems for controlling flights remotely or onboard the vehicle. More specifically, the present disclosure describes embodiments of a control system that allows a user to control the motion of a control target in or along one or more degrees of freedom using a single controller.

30 Claims, 7 Drawing Sheets

(56) References Cited

U.S. PATENT DOCUMENTS

| | | |
|---|---|---|
| 4,584,510 A | 4/1986 | Hollow |
| 4,590,339 A | 5/1986 | Scott-Jackson et al. |
| 4,733,214 A | 3/1988 | Andresen |
| 4,895,039 A | 1/1990 | Hegg |
| 4,914,976 A | 4/1990 | Wyllie |
| 5,042,314 A | 8/1991 | Rytter et al. |
| 5,127,608 A | 7/1992 | Farineau et al. |
| 5,128,671 A | 7/1992 | Thomas, Jr. |
| 5,223,776 A | 6/1993 | Radke et al. |
| 5,317,301 A | 5/1994 | DeVolpi |
| 5,459,382 A | 10/1995 | Jacobus et al. |
| 5,503,040 A | 4/1996 | Wright |
| 5,532,929 A * | 7/1996 | Hattori .................. B60T 8/174 706/905 |
| 5,559,432 A | 9/1996 | Logue |
| 5,565,891 A | 10/1996 | Armstrong |
| D375,765 S | 11/1996 | Kawasaki |
| 5,607,158 A | 3/1997 | Chan |
| 5,617,515 A | 4/1997 | MacLaren et al. |
| 5,643,087 A | 7/1997 | Marcus et al. |
| 5,687,080 A | 11/1997 | Hoyt et al. |
| 5,694,153 A | 12/1997 | Aoyagi et al. |
| D389,198 S | 1/1998 | Hama |
| 5,749,577 A | 5/1998 | Couch et al. |
| 5,781,180 A | 7/1998 | Couch et al. |
| 5,831,408 A | 11/1998 | Jacobus et al. |
| 5,963,196 A | 10/1999 | Nishiumi et al. |
| H1822 H | 12/1999 | Kelley et al. |
| 6,024,576 A | 2/2000 | Bevirt et al. |
| 6,068,554 A | 5/2000 | Tyler |
| 6,198,471 B1 | 3/2001 | Cook |
| 6,201,196 B1 | 3/2001 | Wergen |
| 6,222,525 B1 | 4/2001 | Armstrong |
| 6,353,430 B2 | 3/2002 | Cheng et al. |
| 6,429,849 B1 | 8/2002 | An et al. |
| 6,459,420 B1 | 10/2002 | Harris |
| 6,512,509 B1 | 1/2003 | McVicar |
| 6,580,418 B1 | 6/2003 | Grome et al. |
| 6,597,347 B1 | 7/2003 | Yasutake |
| 6,613,997 B2 | 9/2003 | Oster et al. |
| 6,614,420 B1 | 9/2003 | Han et al. |
| 6,624,806 B2 | 9/2003 | Hsu |
| 6,630,924 B1 | 10/2003 | Peck |
| 6,644,141 B2 | 11/2003 | Oikarinen |
| 6,664,946 B1 | 12/2003 | Stipes et al. |
| 6,865,342 B2 | 3/2005 | Hirata et al. |
| 6,989,497 B1 | 1/2006 | Lee |
| 6,992,602 B2 | 1/2006 | Alexander et al. |
| 7,019,732 B2 | 3/2006 | Furukawa |
| 7,131,389 B1 | 11/2006 | Hawkes |
| 7,170,420 B2 | 1/2007 | Phifer |
| 7,320,263 B2 | 1/2008 | Gustafsson |
| 7,548,697 B2 | 6/2009 | Hudson et al. |
| 7,575,491 B1 | 8/2009 | Martin |
| 7,793,890 B2 | 9/2010 | Scherer |
| 7,823,685 B2 | 11/2010 | Blind |
| 7,931,239 B2 | 4/2011 | Pedersen et al. |
| 8,089,225 B2 | 1/2012 | Goossen |
| 8,100,218 B2 | 1/2012 | Case et al. |
| 8,212,770 B2 | 7/2012 | Obourn et al. |
| 8,258,917 B2 | 9/2012 | Cai et al. |
| 8,273,043 B2 | 9/2012 | Bonutti et al. |
| 8,276,476 B2 | 10/2012 | Diccion |
| 8,300,012 B2 | 10/2012 | Yamamoto |
| 8,344,914 B2 | 1/2013 | Yeh |
| 8,345,004 B1 | 1/2013 | Kass et al. |
| 8,371,187 B2 | 2/2013 | Payandeh et al. |
| 8,380,402 B2 | 2/2013 | Hobenshieid |
| D678,281 S | 3/2013 | Yung |
| 8,471,815 B2 | 6/2013 | Jaouen |
| 8,576,168 B2 | 11/2013 | Kabasawa et al. |
| 8,716,973 B1 | 5/2014 | Lammertse |
| 8,770,055 B2 | 7/2014 | Peterson et al. |
| 8,829,894 B2 | 9/2014 | Banerjee et al. |
| 8,866,597 B2 | 10/2014 | Brendel |
| 8,881,616 B2 | 11/2014 | Dize et al. |
| 8,887,597 B2 | 11/2014 | Black |
| 9,201,514 B1 | 12/2015 | Brandt |
| 9,501,084 B1 | 11/2016 | Bannister |
| 9,504,912 B2 | 11/2016 | Ikeda et al. |
| 9,547,380 B2 | 1/2017 | Parazynski |
| 9,727,076 B2 | 8/2017 | Smith |
| 9,931,701 B1 | 4/2018 | Klein et al. |
| 10,073,488 B2 | 9/2018 | Conro et al. |
| 10,133,271 B2 | 11/2018 | Hutson |
| 10,152,853 B2 | 12/2018 | Provancher et al. |
| 10,198,086 B2 | 2/2019 | Parazynski et al. |
| 10,222,794 B2 | 3/2019 | Deng et al. |
| 10,324,487 B2 | 6/2019 | Parazynski et al. |
| 10,324,540 B1 | 6/2019 | Parazynski |
| 10,331,232 B2 | 6/2019 | Parazynski et al. |
| 10,331,233 B2 | 6/2019 | Parazynski et al. |
| 10,481,704 B2 | 11/2019 | Parazynski et al. |
| 10,520,973 B2 | 12/2019 | Parazynski et al. |
| 10,610,438 B1 | 4/2020 | Dines et al. |
| 10,664,002 B2 | 5/2020 | Parazynski |
| 10,768,658 B2 | 9/2020 | Asano |
| 10,921,904 B2 | 2/2021 | Parazynski et al. |
| 11,194,358 B2 | 12/2021 | Parazynski et al. |
| 11,194,407 B2 | 12/2021 | Parazynski et al. |
| 11,199,914 B2 | 12/2021 | Parazynski et al. |
| 11,281,308 B2 | 3/2022 | Parazynski |
| 2001/0002127 A1 | 5/2001 | Cheng et al. |
| 2002/0080112 A1 | 6/2002 | Braun et al. |
| 2002/0128064 A1 | 9/2002 | Sobota |
| 2002/0148715 A1 | 10/2002 | Oster et al. |
| 2002/0190948 A1 | 12/2002 | Coutant et al. |
| 2003/0006956 A1 | 1/2003 | Wu et al. |
| 2003/0038783 A1 | 2/2003 | Baughman |
| 2003/0058219 A1 | 3/2003 | Shaw |
| 2003/0214484 A1 | 11/2003 | Haywood |
| 2004/0082885 A1 | 4/2004 | Culhane et al. |
| 2004/0083940 A1 | 5/2004 | Shelton et al. |
| 2005/0104742 A1 | 5/2005 | Phifer |
| 2005/0159850 A1 | 7/2005 | Melman |
| 2005/0236536 A1 | 10/2005 | Fan |
| 2005/0277470 A1 | 12/2005 | Watanachote |
| 2006/0137931 A1 | 6/2006 | Berg et al. |
| 2006/0156848 A1 | 7/2006 | Gosselin et al. |
| 2006/0164383 A1 | 7/2006 | Machin et al. |
| 2006/0224280 A1 * | 10/2006 | Flanigan ................ A63H 30/04 701/1 |
| 2006/0262000 A1 | 11/2006 | Strong |
| 2007/0080934 A1 | 4/2007 | Chen et al. |
| 2007/0144279 A1 | 6/2007 | Wu et al. |
| 2007/0156286 A1 | 7/2007 | Yamauchi |
| 2007/0262959 A1 | 11/2007 | Gu |
| 2008/0063400 A1 | 3/2008 | Hudson et al. |
| 2008/0132334 A1 | 6/2008 | Nonaka et al. |
| 2008/0174550 A1 | 7/2008 | Laurila et al. |
| 2008/0217147 A1 | 9/2008 | Martin |
| 2008/0278448 A1 | 11/2008 | Nilsagard et al. |
| 2008/0282507 A1 | 11/2008 | Chiasson et al. |
| 2009/0030353 A1 | 1/2009 | Bonutti et al. |
| 2009/0043310 A1 | 2/2009 | Rasmussen |
| 2009/0084214 A1 | 4/2009 | Sakai et al. |
| 2009/0152782 A1 | 6/2009 | Larson et al. |
| 2009/0179869 A1 | 7/2009 | Slotznick |
| 2009/0213073 A1 | 8/2009 | Obermeyer et al. |
| 2009/0248220 A1 | 10/2009 | Ecton et al. |
| 2009/0267035 A1 | 10/2009 | Wood et al. |
| 2009/0295724 A1 | 12/2009 | Cheng et al. |
| 2010/0097309 A1 | 4/2010 | Nishida et al. |
| 2010/0302017 A1 | 12/2010 | Gugllelmo |
| 2011/0088961 A1 | 4/2011 | Case et al. |
| 2011/0148667 A1 | 6/2011 | Yeh |
| 2011/0213384 A1 | 9/2011 | Jeong |
| 2011/0219899 A1 | 9/2011 | Dize et al. |
| 2012/0012677 A1 | 1/2012 | Crossley, III |
| 2012/0071752 A1 | 3/2012 | Sewell et al. |
| 2012/0152052 A1 | 6/2012 | Suzuki |
| 2012/0187238 A1 | 7/2012 | Lam |
| 2012/0249456 A1 | 10/2012 | Nagata et al. |

(56) References Cited

U.S. PATENT DOCUMENTS

| | | | |
|---|---|---|---|
| 2012/0294696 A1* | 11/2012 | Summer | B25J 9/1689 700/264 |
| 2012/0295501 A1* | 11/2012 | Guglielmo | B63H 21/213 440/84 |
| 2013/0020105 A1 | 1/2013 | Cook | |
| 2013/0081256 A1 | 4/2013 | Richiuso et al. | |
| 2013/0147611 A1 | 6/2013 | Brendel | |
| 2013/0148273 A1 | 6/2013 | Tsai | |
| 2013/0178293 A1 | 7/2013 | Nakayama et al. | |
| 2013/0293362 A1 | 11/2013 | Parazynski | |
| 2013/0296757 A1 | 11/2013 | Kaphingst | |
| 2014/0083225 A1 | 3/2014 | Downs et al. | |
| 2014/0247119 A1 | 9/2014 | Robbins et al. | |
| 2014/0249695 A1 | 9/2014 | Gettings et al. | |
| 2014/0249944 A1 | 9/2014 | Hicks et al. | |
| 2014/0311009 A1 | 10/2014 | Anglin | |
| 2015/0173992 A1 | 6/2015 | Wang | |
| 2015/0174737 A1 | 6/2015 | Chen | |
| 2015/0253801 A1 | 9/2015 | Wuisan et al. | |
| 2016/0068267 A1 | 3/2016 | Liu et al. | |
| 2016/0077589 A1 | 3/2016 | Chataignier et al. | |
| 2016/0195939 A1* | 7/2016 | Parazynski | G08C 19/16 340/12.52 |
| 2016/0241767 A1 | 8/2016 | Cho et al. | |
| 2017/0121000 A1 | 5/2017 | Forslund et al. | |
| 2017/0133175 A1 | 5/2017 | Lin et al. | |
| 2017/0175884 A1* | 6/2017 | Watanabe | F16H 59/08 |
| 2017/0233983 A1 | 8/2017 | Wright | |
| 2017/0246533 A1 | 8/2017 | LaChappell et al. | |
| 2017/0269587 A1 | 9/2017 | Hong | |
| 2017/0277176 A1* | 9/2017 | Hutson | B64D 47/08 |
| 2018/0055591 A1 | 3/2018 | Bonny et al. | |
| 2018/0081387 A1 | 3/2018 | Hisada et al. | |
| 2018/0085277 A1 | 3/2018 | Julin | |
| 2018/0161190 A1 | 6/2018 | Heiter | |
| 2018/0164799 A1 | 6/2018 | Hong | |
| 2018/0271447 A1 | 9/2018 | Zhou | |
| 2018/0356907 A1 | 12/2018 | Parazynski et al. | |
| 2019/0025869 A1 | 1/2019 | Parazynski | |
| 2019/0033987 A1 | 1/2019 | Parazynski et al. | |
| 2019/0041891 A1 | 2/2019 | Parazynski et al. | |
| 2019/0041894 A1 | 2/2019 | Parazynski et al. | |
| 2019/0042003 A1 | 2/2019 | Parazynski et al. | |
| 2019/0042004 A1 | 2/2019 | Parazynski et al. | |
| 2019/0071167 A1* | 3/2019 | Selwa | B64C 27/08 |
| 2019/0243468 A1 | 8/2019 | Parazynski et al. | |
| 2019/0292751 A1* | 9/2019 | Kassen | B60W 50/16 |
| 2020/0053995 A1 | 2/2020 | Andrews | |
| 2020/0056741 A1 | 2/2020 | Macarthur et al. | |
| 2020/0285326 A1 | 9/2020 | Parazynski et al. | |
| 2020/0385956 A1 | 12/2020 | Krivenkov et al. | |
| 2020/0387238 A1 | 12/2020 | Parazynski et al. | |
| 2020/0387239 A1 | 12/2020 | Parazynski et al. | |
| 2020/0393865 A1 | 12/2020 | Parazynski et al. | |
| 2021/0011561 A1 | 1/2021 | Parazynski et al. | |
| 2021/0325977 A1 | 10/2021 | Parazynski et al. | |
| 2022/0164040 A1 | 5/2022 | Parazynski | |
| 2022/0269300 A1 | 8/2022 | Parazynski et al. | |
| 2022/0291708 A1 | 9/2022 | Parazynski et al. | |

FOREIGN PATENT DOCUMENTS

| | | | |
|---|---|---|---|
| CN | 102824746 A | 12/2012 | |
| CN | 108885452 A | 11/2018 | |
| DE | 102015102317 A1 | 8/2016 | |
| EP | 1621954 B1 | 7/2011 | |
| GB | 2091423 A | 7/1982 | |
| JP | H11-154031 | 6/1999 | |
| KR | 20200090786 A | 7/2020 | |
| WO | WO-2007055606 A1 * | 5/2007 | B63H 11/107 |
| WO | WO-2019084504 A1 | 5/2019 | |
| WO | WO 2019/122926 | 6/2019 | |

OTHER PUBLICATIONS

Office Action for U.S. Appl. No. 13/797,184, dated Oct. 16, 2015, 15 pages.

Office Action for U.S. Appl. No. 15/071,624, dated May 17, 2016, 20 pages.

Office Action for U.S. Appl. No. 15/394,490, dated Nov. 21, 2018, 10 pages.

Office Action for U.S. Appl. No. 16/682,509, dated Jul. 20, 2020, 11 pages.

Office Action for U.S. Appl. No. 15/796,744, dated Dec. 21, 2018, 8 pages.

Office Action for U.S. Appl. No. 15/796,744, dated Aug. 7, 2019, 21 pages.

First Office Action for Chinese Application No. 201780080619.X, dated Mar. 16, 2020, 15 pages.

International Search Report and Written Opinion for International Application No. PCT/US2017/058905, dated Feb. 23, 2018, 5 pages.

Office Action for U.S. Appl. No. 15/964,064, dated Mar. 18, 2019, 11 pages.

International Search Report and Written Opinion for International Application No. PCT/US2018/057862, dated Jan. 11, 2019, 15 pages.

Office Action for U.S. Appl. No. 16/163,561, dated Dec. 11, 2018, 13 pages.

International Search Report and Written Opinion for International Application No. PCT/US2018/057864, dated Feb. 26, 2019, 14 pages.

Office Action for U.S. Appl. No. 16/163,563, dated Dec. 12, 2018, 22 pages.

International Search Report and Written Opinion for International Application No. PCT/US2018/057865, dated Jan. 4, 2019, 10 pages.

Office Action for U.S. Appl. No. 16/163,565, dated Dec. 19, 2018, 39 pages.

International Search Report and Written Opinion for International Application No. PCT/US2018/057874, dated Jan. 10, 2019, 10 pages.

"CES 2018: TIE Develop World's First One-Hand Drone Controller System," Live at PC.com, https://liveatpc.com/ces-2018-tie-develops-worlds-first-one-hand-drone-controller-system/, dated Jan. 2018.

"Learn How to Pilot in Less Than 2 Minutes", Wepulsit, http://www.wepulsit.com/, dated 2017.

"H.E.A.R.T.—Hall Effect Accurate Technology: A Unique 3D Technological Innovation Built Into the New Thrustmaster Joystick," Thrustmaster, http://www.thrustmaster.com/press/heart-hall-effect-accurate-technology-unique-3d-technological-innovation-built-new-thrustmaste, dated Jan. 7, 2009.

Pamplona, V. F. et al., "The image-based data glove," Proceedings of the 10th Symposium on Virtual and Augmented Reality, (SVR'2008), Joao Pessoa, Brazil, 2008, 204-211.

Wilbert, J. et al., "Semi-robotic 6 degree of freedom positioning for intracranial high precision radiotherapy; first phantom and clinical results," Radiation Oncology, 5(42), 11 pages, May 26, 2010.

Zhai, X., "Human performance in six degree of freedom input control," Doctoral Dissertation University of Toronto, Graduate Department of Industrial Engineering, 179 pages, 1995.

Office Action for U.S. Appl. No. 16/682,509, dated Mar. 16, 2021, 26 pages.

Extended European Search Report for European Application No. 17865929.8, dated Nov. 13, 2020, 9 pages.

Office Action for U.S. Appl. No. 16/858,202, dated Dec. 30, 2020, 7 pages.

Office Action for U.S. Appl. No. 16/858,212, dated Jan. 29, 2021, 7 pages.

Office Action for U.S. Appl. No. 16/858,217, dated Feb. 3, 2021, 7 pages.

(56) References Cited

OTHER PUBLICATIONS

International Search Report and Written Opinion for International Application No. PCT/US2020/063577, dated Apr. 14, 2021, 9 pages.
Dent, S., "Feel Your Drone With MotionPilot's Haptic Joystick", Engadget, [Online], Retrieved from the Internet: <URL: https://www.engadget.com/2018-01-19-motionpilot-haptic-drone-joystick.html>, dated Jan. 19, 2018, 1 page.
Valentak, Z., "[Review] JJRC H37 Baby Elfie: Is it a Worthy Successor?" DronesGlobe, [Online], Retrieved from the Internet: <URL: http://www.dronesglobe.com/review/baby-elfie/>, dated Oct. 7, 2017, 5 pages.
"InnovRC Firmware v1.2", InnovRC, http://www.innovrc.de/ivrcwiki/index.php?title=Hauptseite, dated Mar. 2013, 2 pages.
Partial Supplementary European Search Report for European Application No. 18871801.9, dated May 27, 2021, 15 pages.
First Office Action for Chinese Application No. 201880083427.9, dated Jun. 28, 2021, 13 pages.
Extended European Search Report for European Application No. 18870577.6, dated Jul. 23, 2021, 8 pages.
Extended European Search Report for European Application No. 18870040.5, dated Jun. 25, 2021, 9 pages.
Extended European Search Report for European Application No. 18871150.1, dated Aug. 19, 2021, 10 pages.
Extended European Search Report for European Application No. 18871801.9, dated Aug. 27, 2021, 13 pages.
Office Action for U.S. Appl. No. 17/155,946, dated Aug. 2, 2021, 7 pages.
Office Action for U.S. Appl. No. 17/729,924, dated Aug. 4, 2022, 14 pages.
International Search Report and Written Opinion for International Application No. PCT/US2022/016963, dated Jun. 3, 2022, 15 pages.
Office Action for U.S. Appl. No. 17/679,471, dated Apr. 29, 2022, 11 pages.
Office Action for U.S. Appl. No. 17/155,946, dated Feb. 16, 2022, 8 pages.
Office Action for U.S. Appl. No. 17/679,471, dated Sep. 6, 2022, 13 pages.
Office Action for U.S. Appl. No. 17/729,888, dated Oct. 6, 2022, 19 pages.

* cited by examiner

APPARATUS, METHODS AND SYSTEMS FOR REMOTE OR ONBOARD CONTROL OF FLIGHTS

RELATED APPLICATIONS

This application claims priority to and the benefit of U.S. Provisional Patent Application No. 62/945,339, filed on Dec. 9, 2019, the disclosure of which is hereby incorporated by reference in its entirety.

FIELD OF THE INVENTION

The present disclosure relates generally to control systems, and in particular apparatus, methods, and systems for controlling flights of Unmanned Aerial Systems (UAS) as well as onboard-piloted aircraft. Some embodiments disclose a controller that includes an interface for controlling the thrust of control targets such as flying objects. The controller may also have a feedback system configured to alert pilots of obstacles that a flying object senses on its flying path.

DETAILED DESCRIPTION

The present disclosure describes embodiments of a control system that allows a user to control the motion of a control target in or along one or more degrees of freedom (DoF) using a single controller. For example, a unified hand controller may allow a user to control the motion of a target in one or more DoFs, the one or more DoFs including three rotational DoFs (e.g., pitch, yaw, and roll) and three translational DoFs (e.g., movements along x, y and z axes). For instance, a unified hand controller may allow a user to control the motion of a target in three rotational DoFs (e.g., pitch, yaw, and roll) and one translational DoF (e.g., movements along z axis). The control system may also be configured to allow a user to control the movements of a control target in virtual settings, such as but not limited to gaming environments. In some embodiments, the control system may also allow a user to receive feedback from the control target based on sensory inputs or measurements procured by the control target, whether in real or virtual environments.

Figure 1:
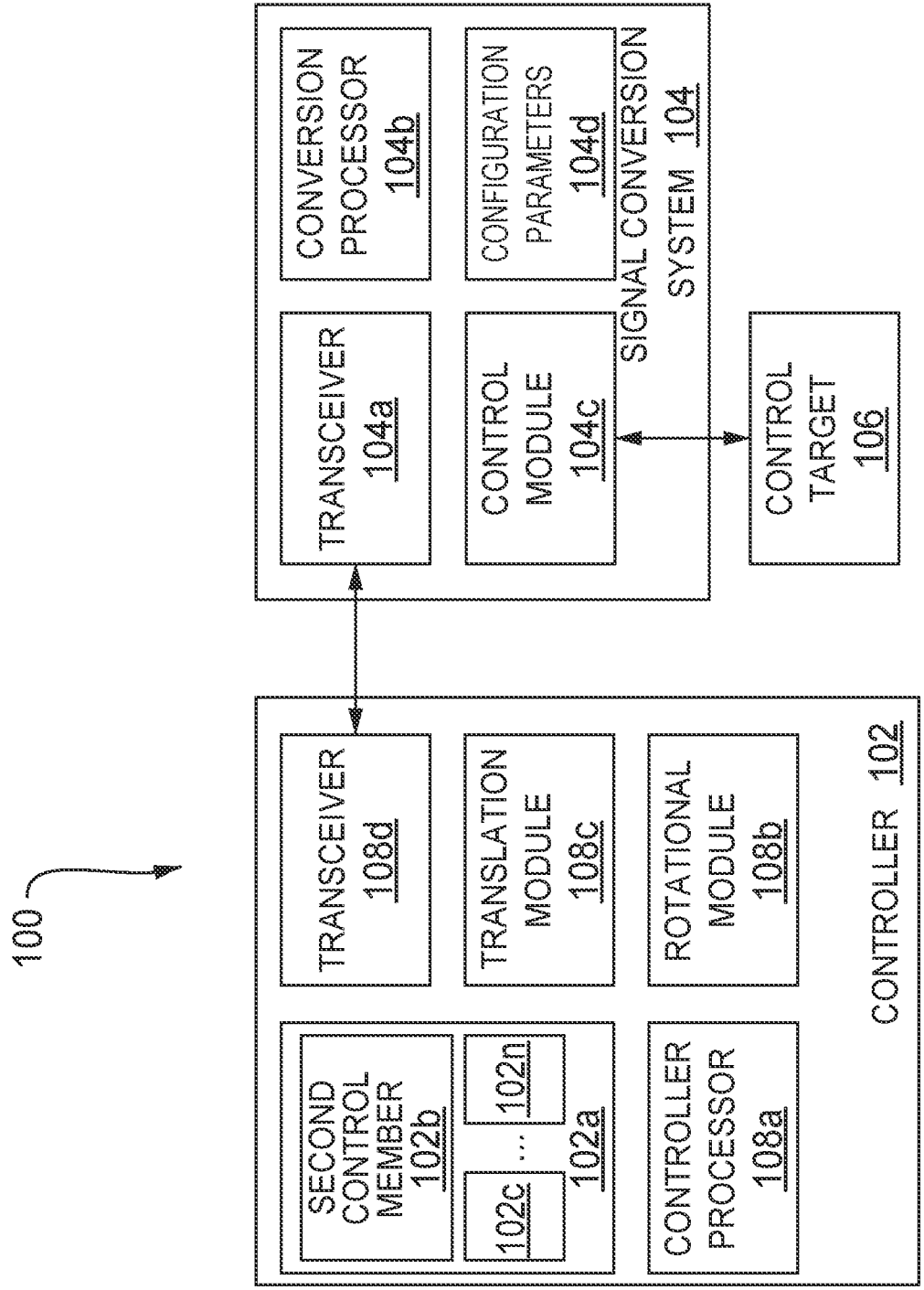
FIG. 1 is an example schematic of a control system for remote or onboard control of flights, according to an embodiment.

With reference to FIG. 1, an example schematic of a control system 100 that includes a controller 102 coupled to a signal conversion system 104 that is further coupled (e.g., remotely) to a control target 106 is shown, according to some embodiments. The control target 106 can be physical or virtual objects, such as remotely controlled objects (e.g., drones, aircraft, fixed-wing aircraft, helicopters, robots, end effectors (e.g., the end of a robotic forceps, a robotic arm end effector), etc.), camera field-of-views (e.g., including a camera center field-of-view and zoom), vehicle velocity vectors, and/or the like. In some embodiments, rather than being remotely controlled, the controller 102 can be onboard the control target 106. In such embodiments, for example, the operator, pilot, etc., may be onboard the control target 106 (e.g., a piloted/crewed flight). Other examples of control targets, whether remotely controlled or otherwise, include electric, hybrid, and/or combustion powered aircrafts, remotely operated vehicles (ROVs), crewed submersibles, spacecrafts, and virtual crafts (e.g., operative in a three-dimensional virtual world). In some embodiments, the controller 102 and the signal conversion system 104 may be combined into a single system, while in other embodiments, the controller 102 and the signal conversion system 104 may be separate (e.g., physically distinct, in separate housings, etc.) systems. In some implementations, the controller 102 includes multiple control members 102a-102n. For example, the controller 102 may include the first control member 102a, which in turn may include or incorporate the rest of the control members 102b-102n, i.e., the rest of the control members 102b-102n may be located on the first control member 102a, which in turn is a part of the controller 102. A controller processor 108a is coupled to each of the control members 102a-102n. In an embodiment, the controller processor 108a may be a central processing unit, a programmable logic controller, and/or a variety of other processors. The controller processor 108a may also be coupled to each of a rotational module 108b, a translational module 108c, and a transceiver 108d. In some implementations, there may exist one or more connections and/or couplings (e.g., wired or wireless) between the multiple control members 102a-102n, the controller processor 108a, the rotational module 108b, the translational module 108c, and the transceiver 108d.

The signal conversion system 104 in the control system 100 includes a transceiver 104a that may couple to the transceiver 108d in the controller 102 through a wired connection, a wireless connection, and/or a variety of other connections. A conversion processor 104b is coupled to the transceiver 104a, a control module 104c, and configuration parameters 104d that may be included on a memory, a storage device, and/or other computer-readable mediums. In an embodiment, the conversion processor 104b may be a central processing unit, a programmable logic controller, and/or a variety of other processors. In some implementations, there may exist connections and/or couplings (e.g., wired or wireless) between the transceiver 104a, the conversion processor 104b, the control module 104c, and the configuration parameters 104d. The control module 104c may be coupled to the control target 106 through a wired connection, a wireless connection, and/or a variety of other connections.

In an embodiment, the controller 102 is configured to receive input from a user through one of more of the multiple control members 102a-102n and transmit a signal based on the input. For example, the controller 102 may be provided as a "joystick" or a control stick configured for navigating in a virtual environment (e.g., in a video game, on a real-world simulator, in a virtual reality environment, in an augmented reality environment, as part of a remote control virtual/real-world control system, and/or in a variety of other virtual environments). In another example, the controller 102 may be provided as a control stick for controlling a vehicle, which may be manned or unmanned, such as but not limited to an aircraft, a submersible, a spacecraft, a watercraft, and/or the like. That is, the controller 102 may be provided as a control stick for controlling flying objects such as but not limited to unmanned or remotely-piloted vehicles (e.g., "drones"); manned, unmanned, or remotely-piloted vehicles and land-craft; manned, unmanned, or remotely-piloted aircraft (e.g., fixed-wing aircraft); manned, unmanned, or remotely-piloted watercraft; manned, unmanned, or remotely-piloted submersibles; manned, unmanned, or remotely-piloted space vehicles, rocketry, satellites, and/or the like. In some implementations, the controller 102 may be provided as a control stick for controlling an electric crewed aerial vehicle, such as, for example, a piloted multirotor drone, often known as an electric-Vertical Takeoff and Land (e-VTOL) aircraft. In another example, the controller 102 may be provided as a control stick for controlling a robot or other non-vehicle device (e.g., a surgical device, an assembly device, and/or the like). FIGS. 2A-2E show example schematic implementations of the controller 102 (or 202).

Rotational inputs using the first control member 102*a* may be detected and/or measured using the rotational module 108*b*. For example, the rotational module 108*b* may include displacement detectors for detecting the displacement of the first control member 102*a* from a starting position as one or more of the pitch inputs, yaw inputs, and roll inputs discussed above. Displacement detectors may include photo detectors for detecting light beams, rotary and/or linear potentiometers, inductively coupled coils, physical actuators, gyroscopes, switches, transducers, and/or a variety of other displacement detectors. In some embodiments, the rotational module 108*b* may include accelerometers for detecting the displacement of the first control member 102*a* from a starting position in space. For example, the accelerometers may each measure the proper acceleration of the first control member 102*a* with respect to an inertial frame of reference.

In some embodiments, inputs using the first control member 102*a* may be detected and/or measured using breakout switches, transducers, and/or direct switches for each of the three ranges of motion (e.g., front to back, side to side, and rotation about a longitudinal axis) of the first control member 102*a*. For example, breakout switches may be used to detect when the first control member 102*a* is initially moved (e.g., by an angular displacement in the range from about 0.5 degree to about 5 degrees, from about 1 degree to about 3 degrees, about 2 degrees, including values and subranges therebetween) from a null position for each range of rotation; transducers may provide a signal that is proportional to the displacement of the first control member 102*a* for each range of motion, and direct switches may detect when the first control member 102*a* is further moved (e.g., by an angular displacement in the range from about 10 degrees to about 15 degrees, from about 11 degree to about 13 degrees, about 12 degrees, including values and subranges therebetween) from the null position for each range of motion. The breakout switches and direct switches may also allow for acceleration of the first control member 102*a* to be detected.

In an embodiment, redundant detectors and/or switches may be provided in the controller 102 to ensure that the control system 100 is fault tolerant.

Translational inputs using the second control member 102*b* may be detected and/or measured using the translational module 108*c*. For example, the translational module 108*c* may include translational detectors for detecting the displacement of the second control member 102*b* from a starting position as the z-axis (i.e., vertical motion) inputs discussed above. As an example illustration, the second control member 102*b* can be a wheel (e.g., knurled wheel) as discussed with reference to FIGS. 2A-C, and the translational module 108*c* may be configured to detect the rotation of the wheel as input related to the z-axis motion of the control target 106. Translation detectors may include physical actuators, translational accelerometers, and/or a variety of other translation detectors (e.g., detectors and switches discussed above for detecting and/or measuring rotational input may be repurposed for detecting and/or measuring translation input). In some embodiments, the second control member 102*b* can be spring-centered and configured to be pushed down by a user (e.g., towards the surface of the first control member 102*a* from which it extends), and pulled up by a user (e.g., away from the surface of the first control member 102*a* from which it extends), to, for example, provide Z-axis movement or control of the control target 205 (pushing down causing movement in the negative Z direction, and pulling up causing movement in the positive Z direction, for example).

In an embodiment, the controller processor 108*a* of the controller 102 is configured to generate control signals to be transmitted by the transceiver 108*d*. As discussed above, the controller processor 108*a* may be configured to generate a control signal based on one or more rotational inputs detected and/or measured by the rotational module 108*b* and/or one or more translational inputs detected and/or measured by the translational module 108*c*. Those control signal generated by the controller processor 108*a* may include parameters defining movement output signals for one or more of 4-DOF (i.e., pitch, yaw, roll, movement along a z-axis). In several embodiments, a discrete control signal type (e.g., yaw output signals, pitch output signals, roll output signals, and z-axis movement output signals) is produced for each discrete predefined movement (e.g., first control member 102*a* movement for providing pitch input, first control member 102*a* movement for providing yaw input, first control member 102*a* movement for providing roll input, and second control member 102*b* movement for providing z-axis input) that produces that discrete control signal. Beyond 4-DOF control, discrete features such as ON/OFF, trim, and other multi-function commands may be transmitted to the control target 106. Conversely, data or feedback may be received on the controller 102 (e.g., an indicator such as an LED may be illuminated green to indicate the controller 102 is on).

In an embodiment, the transceiver 108*d* of the controller 102 is configured to transmit the control signal through a wired or wireless connection. For example, the control signal may be one or more of a radio frequency ("RF") signal, an infrared ("IR") signal, a visible light signal, and/or a variety of other control signals. In some embodiments, the transceiver 108*d* may be a BLUETOOTH® transmitter configured to transmit the control signal as an RF signal according to the BLUETOOTH® protocol.

In an embodiment, the transceiver 104*a* of the signal conversion system 104 is configured to receive the control signal transmitted by the transceiver 108*d* of the controller 102 through a wired or wireless connection, discussed above, and provide the received control signal to the conversion processor 104b of the signal conversion system 104. In some implementations, the transceiver 108d can be configured to receive signals (for example, from the transceiver 104a).

In an embodiment, the conversion processor 104b is configured to process the control signals received from the controller 102. For example, the conversion processor 104b may be coupled to a computer-readable medium including instructions that, when executed by the conversion processor 104b, cause the conversion processor 104b to provide a control program that is configured to convert the control signal into movement commands and use the control module 104c of the signal conversion system 104 to control the control target 106 according to the movement commands. In an embodiment, the conversion processor 104b may convert the control signal into movement commands for a virtual three-dimensional ("3D") environment (e.g., a virtual representation of surgical patient, a video game, a simulator, a virtual reality (VR) environment, an augmented virtual reality (AVR environment), and/or a variety of other virtual 3D environments). Thus, the control target 106 may exist in a virtual space, and the user may be provided a point of view or a virtual representation of the virtual environment from a point of view inside the control target (i.e., the control system 100 may include a display that provides the user a point of view from the control target in the virtual environment). In another example, the control target 106 may be a physical device such as a robot, an end effector, a surgical tool, a lifting system, etc., and/or a variety of steerable mechanical devices, including, without limitation, vehicles such as unmanned or remotely-piloted vehicles (e.g., "drones"); manned, unmanned, or remotely-piloted vehicles and land-craft; manned, unmanned, or remotely-piloted aircraft (e.g., fixed-winged aircraft); manned, unmanned, or remotely-piloted watercraft; manned, unmanned, or remotely-piloted submersibles; as well as manned, unmanned, or remotely-piloted space vehicles, rocketry, satellites, and such like.

In an embodiment, the control module 104c of the signal conversion system 104 is configured to control movement of the control target 106 based on the movement commands provided from the control program in signal conversion system 104. In some embodiments, if the control target 106 is in a virtual environment, the control module 104c may include an application programming interface (API) for moving a virtual representation or point of view within the virtual environment. API's may also provide the control module 104c with feedback from the virtual environment such as, for example, collision feedback. In some embodiments, feedback from the control target 106 may allow the control module 104c to automatically adjust the movement of the control target to, for example, avoid a collision with a designated region (e.g., objects in a real or virtual environment, critical regions of a real or virtual patient, etc.). In other embodiments, if the control target 106 is a physical device, the control module 104c may include one or more controllers for controlling the movement of the physical device. For example, the signal conversion system 104 may be installed on-board a vehicle, and the control module 104c may include a variety of physical controllers for controlling various propulsion and/or steering mechanisms of the vehicle.

In an embodiment, the signal conversion system 104 includes operating parameters 104d for use by the conversion processor 104b when generating movement commands using the signals from the controller 102. Operating parameters may include, but are not limited to, gains (i.e., sensitivity), rates of onset (i.e., lag), deadbands (i.e., neutral), limits (i.e., maximum angular displacement), and/or the like. In an embodiment, the gains of the first control member 102a and the second control member 102b may be independently defined by a user. In this example, the second control member 102b may have increased sensitivity compared to the first control member 102a to compensate, for example, for the second control member 102b having a smaller range of motion that the first control member 102a. Similarly, the rates of onset for the first control member 102a and the second control member 102b may be defined independently to determine the amount of time that should pass (i.e., lag) before a repositioning of the first control member 102a and the second control member 102b should be converted to actual movement of the control target 106. The limits and deadbands of the first control member 102a and the second control member 102b may be independently defined as well by calibrating the neutral and maximal positions of each.

In an embodiment, operating parameters may also define how signals sent from the controller 102 in response to the different movements of the first control member 102a and the second control member 102b are translated into movement commands that are sent to the control target. As discussed above, particular movements of the first control member 102a may produce pitch, yaw, and roll rotational movement output signals, while particular movements of the second control member 102b may produce z-axis (i.e., vertical) translational movement output signals. In an embodiment, the operating parameters may define which movement commands are sent to the control target 106 in response to movements and resulting movement output signals from the first control member 102a and second control member 102b.

In some embodiments, the operating parameters 104d may be received from an external computing device (not shown) operated by the user. For example, the external computing device may be preconfigured with software for interfacing with the controller 102 and/or the signal conversion system 104. In other embodiments, the operating parameters 104d may be input directly by a user using a display screen included with the controller 102 or the signal conversion system 104. For example, the first control member 102a and/or second control member 102b may be used to navigate a configuration menu for defining the operating parameters 104d.

With reference to FIGS. 2A-2E, in some embodiments, the controller 202 includes a control stick 202a as the first control member 102a that is configured to be repositioned by the user with respect to the base 208. The repositioning of the control stick 202a allows the user to provide rotational inputs using the first control member 102a (e.g., three degrees of freedom) that include pitch inputs, yaw inputs, and roll inputs, and causes the controller processor 108a to output rotational movement output signals including pitch movement output signals, a yaw movement output signals, and roll movement output signals. In particular, tilting the control stick 202a forward and backward along the axis "A" (FIG. 2A) with respect to the base 208 (i.e., tilting the control stick 202a forward and backward about the coupling junction 207) may provide the pitch input that produces the pitch movement output signal, rotating the control stick 202a left and right about its longitudinal axis with respect to the base 208 (i.e., rotating along "B" line about the coupling junction 207 (FIG. 2A) may provide the yaw input that produces the yaw movement output signal, and tilting the control stick 202a side to side along the axis "C" with respect to the base 208 (i.e., tilting the control stick 202a side to side about the coupling junction 207) may provide the roll input that produces the roll movement output signal. In some implementations, the movement output signals that result from the repositioning of the first control member 102a may be reconfigured from that discussed above such that similar movements of the first control member 102a to those discussed above result in different inputs and movement output signals (e.g., tilting the control stick 202a side to side along the axis "C" with respect to the base 208 may be configured to provide the yaw input that produces the yaw movement output signal while rotating the control stick 202a about its longitudinal axis may be configured provide the roll input that produces the roll movement output signal).

Figure 2A:
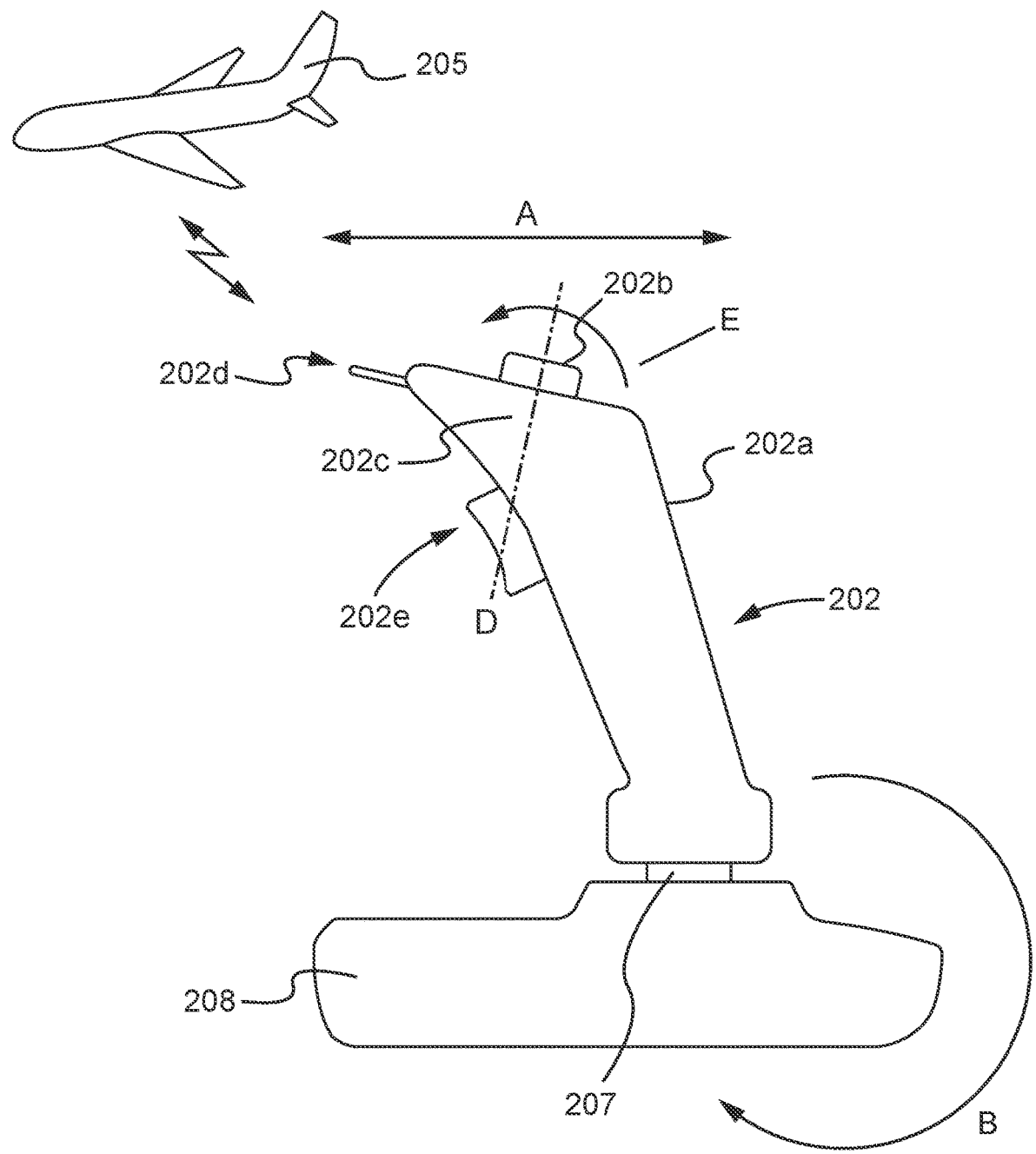
FIG. 2A is a side view illustrating a controller including the control system of FIG. 1, according to an embodiment.

In some embodiments, the control stick 202a includes a wheel 202b (e.g., knurled wheel) as one of the multiple control members 202b-202n. For example, the wheel 202b can be the second control member 102b that is configured to be rotated by the user of the controller 202 about or with respect to the axis "D" (FIGS. 2A and 2C) along the line E (FIG. 2A). The rotation of the second control member 102b allows the user to provide translational movement input to the controller using the second control member 102b and causes the controller processor 108a to output translational movement output signals including vertical or z-axis movement output signals. The translational movement input may include input related to the throttle thrust (e.g., when the control target is a fixed-wing aircraft) and direction of the second control member 102b. For example, a user of the controller 102 may apply a force on the wheel 202b to cause the wheel 202b to rotate in a forward direction or backward direction along the line E and about or with respect to the axis "D". The translational movement input can include the throttle setting of the wheel 202b after the force is applied (e.g., corresponding to the thrust of the throttle) and/or the direction of the force (e.g., corresponding to the direction of the throttle), and the translational movement output signals generated by the controller processor 108a as a result of the input can include output signals related to the speed of the control target 205 and/or the direction of the movement of the control target 205 (e.g., up (+z axis) or down (−z axis) direction), respectively.

Figure 2B:
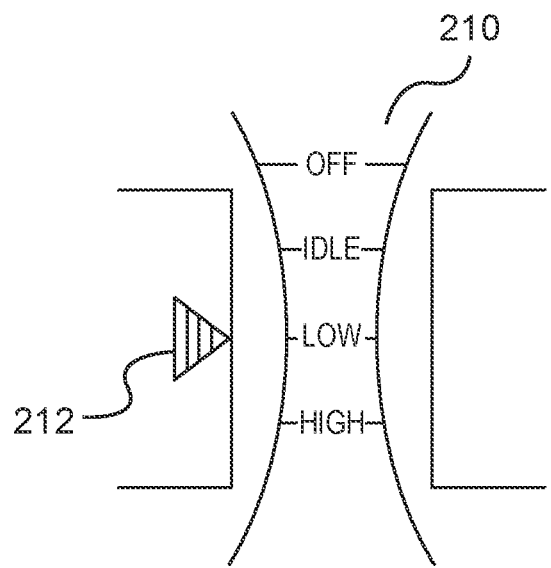
FIG. 2B is a view illustrating the control system of FIG. 1, according to an embodiment.
Figure 2C:
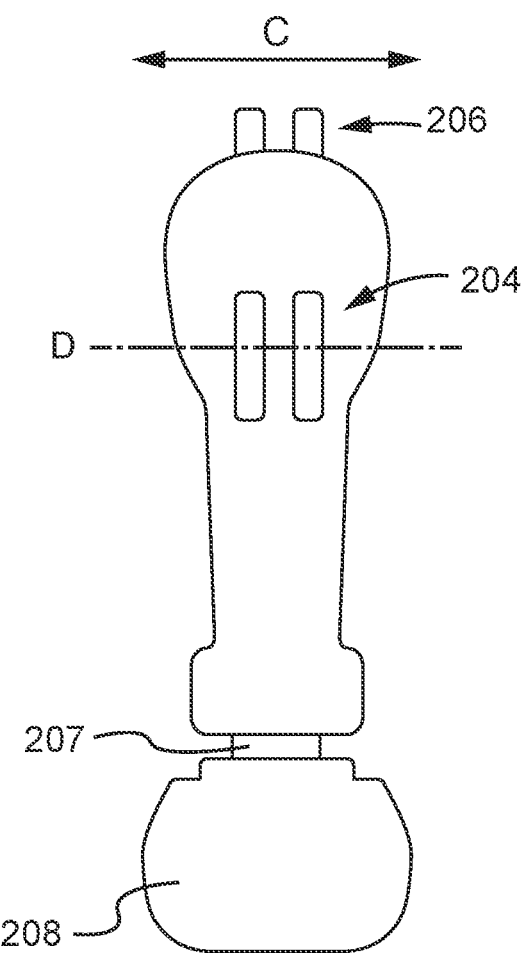
FIG. 2C is a front view illustrating the controller of FIG. 2A, according to an embodiment.

As a non-limiting illustrative example, with reference to FIG. 2B, the wheel 202b may include markings 210 that include values or modes of the throttle setting of the wheel 202b, such a throttle setting corresponding to the mobility state of the control target 205 such as but not limited to an "off" setting corresponding to the engine/motor(s) of the control target 205 being turned off, an "idle" setting corresponding to the engine/motor(s) of the control target 205 being idled, and/or one or more settings corresponding to the control target 106 being in motion (e.g., traveling in the vertical or z-direction at "low" speed, "high" speed, etc.). The controller 202 may include an indicator 212 (e.g., a tab) that is configured to identify the marking that aligns with the indicator 212 when the wheel 202b comes to rest as the throttle setting of the wheel 202b. For instance, when the mobility state of the control target 205 is off or idle (i.e., the engine/motors of the control target 205 are off or idling, respectively), the controller 202 and the wheel 202b may be positioned relative to each other such that the indicator 212 is aligned with the marking on the wheel 202b identifying the throttle setting of the wheel 202b as "off" or "idle", respectively. A user may then apply force onto the wheel 202b to rotate the wheel 202b such that the indicator 212 aligns with the marking on the wheel 202b identifying the throttle setting of the wheel 202b as "low," "high," or any other throttle setting.

In some implementations, the responsiveness of the second control member 102b to an applied force by a user may be regulated by another control member (e.g., one or more of the control members 102c-102n). For example, the responsiveness of the wheel 202b to the amount of force applied on the wheel 202b when changing the throttle setting of the wheel 202b may be regulated by a tension tuner 202c that is configured to vary the friction experienced by the wheel 202b as the wheel 202b rotates under the influence of the force. That is, the throttle setting of the wheel 202b may be adjusted by the tension tuner 202c. As such, the amount of force one may have to apply to the wheel 202b to produce a given amount of control target speed may be varied using the tension tuner 202c. For example, the tension tuner 202c may have a range of settings (values or modes, for example), and when the tension tuner 202c is set at different values or modes, a user may have to apply different amounts of force to the wheel 202b to produce same control target speed.

In some embodiments, the controller 102 may include a safety mechanism 202d configured to prevent the unintended rotation of the wheel 202b, and as such unintended change in the throttle setting of the wheel 202b, which may correspond to unintended change in mobility state of the control target 205. For example, the safety mechanism 202d can be one of the multiple control members 102a-102n and may be configured to prevent the wheel 202b from rotating along the line E (i.e., about or with respect to the axis "D") (even when force is applied by the user, for example) unless the safety mechanism is deactivated (e.g., a preceding or concurrent action is taken with respect to the safety mechanism 202d). For instance, the safety mechanism 202d may include a ball plunger that would have to be depressed for the safety mechanism 202d to allow the wheel 202b to rotate when a force is applied on the wheel 202b by the user. In some implementations, no throttle setting of the wheel 202b may be changed unless the safety mechanism 102d is deactivated. In other implementations, a first set of throttle settings of the wheel 202b may not be changed to a second set of throttle settings unless the safety mechanism 202d is deactivated, while other changes can occur without deactivating the safety mechanism 202d. For instance, the safety mechanism 202d may be configured such that a throttle setting change from "idle" to "off" may not be allowed unless the safety mechanism 202d is deactivated (e.g., the ball plunger is depressed), preventing unintended rotation of the wheel 202b, and consequently unintended change in the mobility state of the control target 106 from "idle" to "off" as well.

In some embodiments, the multiple control members 102a-102n include, in addition to the control stick 202a, the wheel 202b, the tension tuner 202c and/or the safety mechanism 202d, other control members configured to allow a user provide inputs to the controller 202, and cause the controller processor 108a to generate output signals for transmission to the control target 205. In some implementations, the other control members may also be configured to receive data from the control target 205 and/or external devices (not shown) and display the data (or representation thereof) at a user interface (not shown) of the controller 202. For example, the other control members may include a radio communications interface (e.g., push-to-talk radio button), a control member for steering the nose wheel of the control target 205, a control member for reversing thrust, and/or the like.

As another example, the other control members may include a trim control 202e configured to allow a user input settings for the DoFs of the control target 205 controlled by the controller 202. For example, the trim control 202e may be configured to allow a user input command settings for one or more of the three rotational DoFs of the control target 205, i.e., one or more of the pitch, the yaw, and the roll of the control target 205. In some implementations, the trim control 202e may be configured to allow a user input command settings for the one translational DoF of the control target 205 (e.g., movement along z axis). For instance, the trim control 202e may be in the form of trim buttons that allow a user input command settings (e.g., rotational parameters for the pitch, yaw and/or roll of the control target 205) for the control target to be guided by during its motion. The trim control 202e (e.g., the set of trim buttons for the pitch, yaw and/or roll) may be configured to be separable from the control stick 202a. For example, the control stick 202a may include a button (e.g., a push button) configured to cause the release or decoupling of the trim control 202e from the control stick 202a when engaged (e.g., pushed).

In some embodiments, the control target 205 may be powered by multiple power sources, and the controller 202 may be configured to allow a user to control the motion of a control target 205 in the one or more DoFs (e.g., the three rotational DoFs (e.g., pitch, yaw, and roll) and one translational DoF (e.g., longitudinal movement along the x axis such as thrust for a fixed-wing aircraft)) by controlling the individual power sources separately as discussed throughout the instant specification. For example, the control target 205 may be a multi-engine flying object, and the control stick 202a may include multiple wheels 204 where each wheel of the multiple wheels 204 is configured for controlling one engine of the multi-engine control target 205 (e.g., a multi-engine commercial jet aircraft, such as a B737 or the like). With each wheel of the multiple wheels 204 configured to control an engine of the multi-engine control target 205, one of the wheels can be manipulated to shut down one of the engines while the other wheel can be manipulated to control the other engine. In such examples, the safety mechanism 206 may also include at least as many safety mechanism elements as the number of wheels of the multiple wheels 204, and each safety mechanism element may be configured to prevent the unintended rotation of the respective wheel of the multiple wheels 204. In some implementations, the safety mechanism 206 can be configured to prevent abrupt shutoff of a motor, engine, rotor, and/or the like associated with the control target. More specifically, the safety mechanism 206 can prevent one or more wheels 204 from moving from an "idle" position to an "off" position when the safety mechanism 206 is engaged, and allow movement from the "idle" position to the "off" position when the safety mechanism 206 is disengaged. In this manner, at least two actions are required to transition from "idle" to "off" including disengagement of the safety mechanism 206 and manipulation of the one or more wheels 204. In some implementations, the multiple wheels 204 may be synchronized with each other such that when a user of the controller 202 applies a force on one of the multiple wheels 204 to cause that multiple wheel to rotate, the other(s) of the multiple wheels 204 may also rotate in a substantially similar manner as that multiple wheel. In other implementations, the multiple wheels 204 may not be synchronized and a user may engage the multiple wheels 204 separately to control the multiple power sources of the control target 205 separately. For instance, a user may use one of the multiple wheels 204 to idle or shut down one engine of the multi-engine control target 205 (e.g., by aligning the throttle setting "idle" or "off" of that one wheel with the indicator 212 of the controller 202, respectively) while the other engine is operating. The synchronization, or lack thereof, of the multiple wheels 204 may be controlled by a synchronicity control element (e.g., a tab) (not shown) that is located on the controller 202 and configured to allow a substantially precise adjustment of the throttle settings of the multiple wheels 204 with one hand of a user while the other hand is placed on the control stick 202a.

Figure 2D:
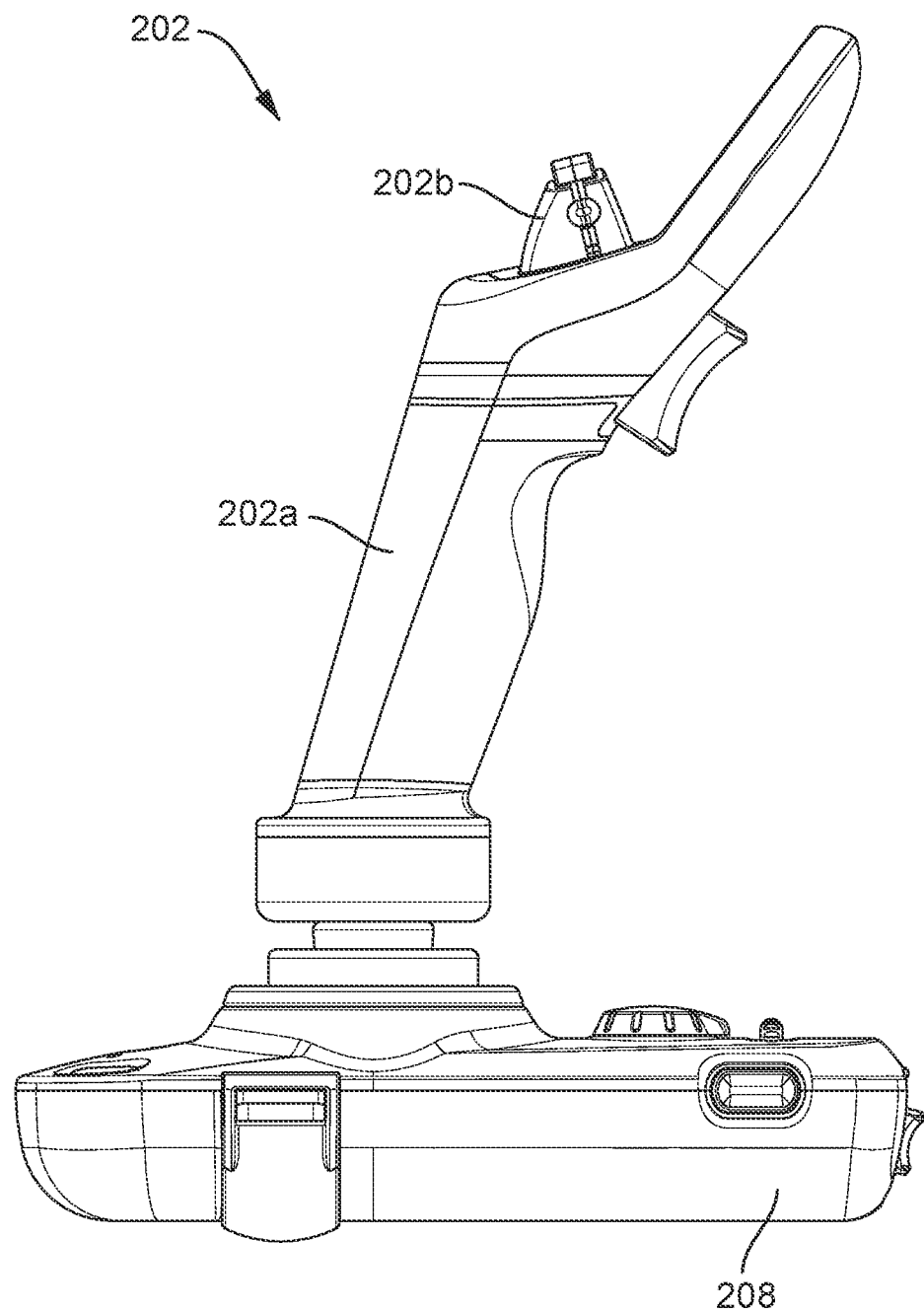
FIG. 2D is a side view illustrating a controller including the control system of FIG. 1, according to an embodiment.

In some embodiments, with reference to FIG. 2D, the controller 202 has (a) a first control member 202a, a joystick-like structure with three independent degrees of movement that is intended to be gripped by a user's hand, and (b) a second control member 202b mounted on the first control member 202a for manipulation by a thumb or other digit on the hand of the user that is gripping the first control member 202a, which enable a user to generate four independent control inputs for commanding movement of the vehicle in four DoFs. A proximal end of the first control member 202a is pivotally connected to the base 208 so that the first control member 202a can be independently pivoted along an x-axis and independently pivoted along a y-axis. In this example, the base 208 is configured to be supported by a user (e.g. held by a user's hand or otherwise carried on the user's body such as by an arm brace, harness, etc.). A base supported by a user provides a consistent, known reference frame even while moving, e.g., walking, skiing, running, driving, can be used for inspection, security and cinematographic drone missions.

In some embodiments, a resilient member such as, for example, a spring, may be positioned between the first control member 202a and the base 208 in order to provide resilient movement up or down along the longitudinal axis of the first control member 202a. In some embodiments, such movement up or down along the longitudinal axis of the first control member relative to the base 208 may be configured to generate Z-axis movement (up or down, vertical movement) of the control target. In some embodiments, movement forward or aft relative to the longitudinal axis of the first control member relative to the base 208 may be configured to generate X-axis movement (forward or aft, longitudinal movement) of the control target (e.g., a fixed-wing aircraft).

Figure 2E:
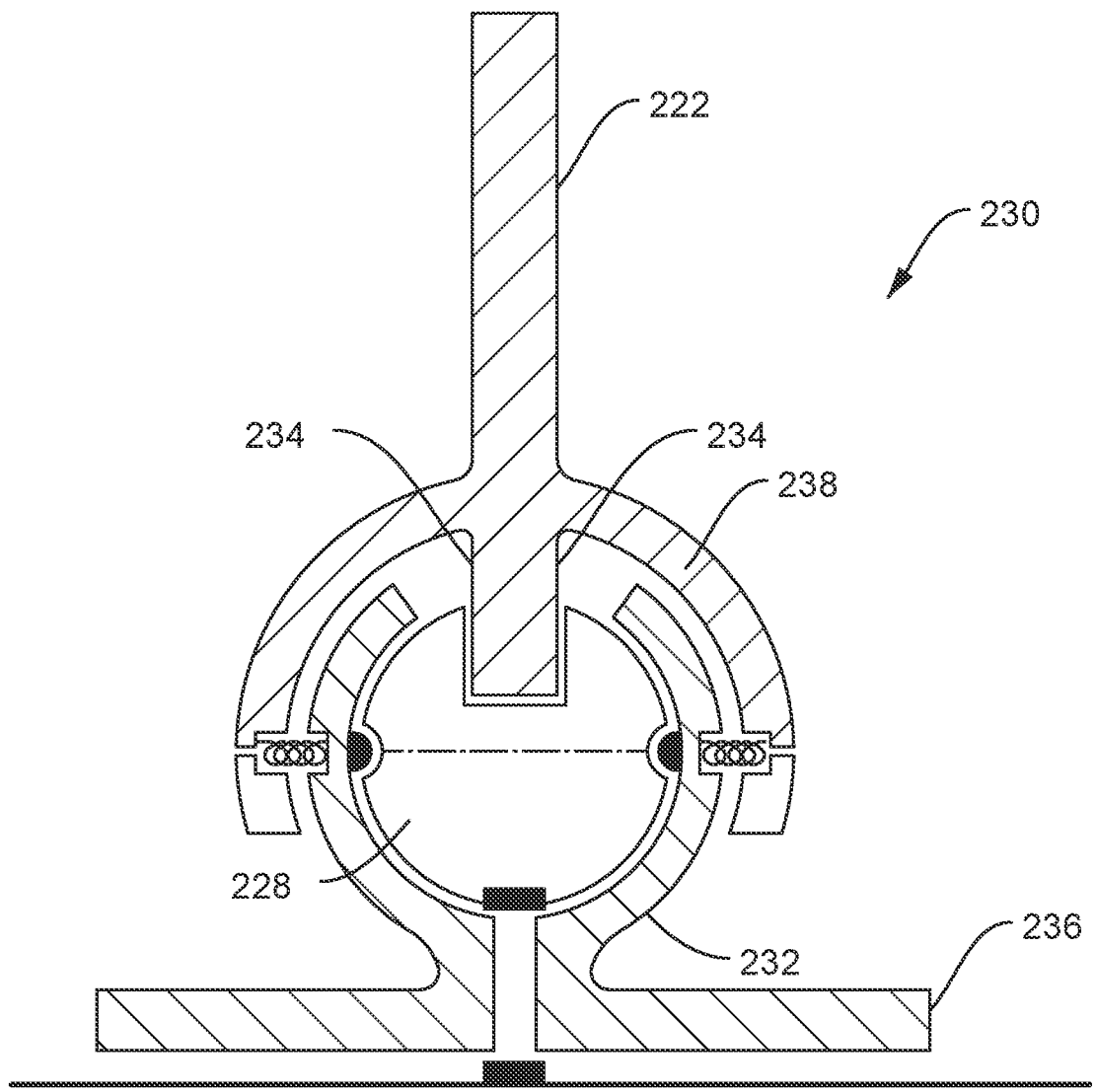
FIG. 2E is a cross-sectional side view illustrating a gimbal mechanism of the controller of FIG. 2D, according to an embodiment.

In some embodiments, with reference to FIG. 2E, the controller 202 can include a two-axis gimbal mount 230 that can be used as part of an input device for generating control inputs to command a camera or sensor steering system. The two-axis gimbal mount 230 can be used to support simultaneous angular displacement and measurement of the angular displacement in two DoFs but may be adapted by locking one DoF to be used to support a first control member 202a (e.g., as shown in FIG. 2D) for displacement in a single DoF. The gimbal can be mounted in a base, such as base 208. Its post 222 can couple the gimbal mount 230 to the first control member 202a. The first control member 202a pivots the post 222 about two orthogonal axes that intersect at the center of the gimbal. One axis remains fixed relative to the base and the other rotates about the fixed axis. Two-axis gimbal mount 230 is a representative example of a two-axis gimbal that has been adapted to generate to haptic feedback upon the first control member 202a leaving and reentering a predefined null position for each of these two axes of rotation.

Furthermore, in an alternate embodiment in which the gimbal can be locked or blocked from rotation about one axis to allow only for rotation about one axis, the detents for generating force feedback for rotation about the locked or blocked axis could be omitted.

The gimbal can be comprised of two members: a first member 232 that remains fixed with respect to base 236 and a second member 228 that is constrained by the first member 232 to rotate about a single axis or to rotate about each of two orthogonal axes, and to otherwise restrict relative rotation of the first and second members 232, 228 around any other axis. A post 222 is coupled to the second member 228 to pivot about each of the two orthogonal axes. If the second member 228 is restricted to rotate only about one of the two orthogonal axes, the post 222 is coupled with the second member 228 so that it is can pivot about the second axis without rotating the second member 228.

In this particular implementation, which is intended to be representative, a ball (i.e., the second member) 228 is mounted within a socket (i.e., the first member) 232. An extension 234 of the post 222 fits within a complementary opening formed in the ball 228 so that angular displacement or pivoting of the post 222 also rotates the ball 228. In this example, the ball 228 is retained within the socket 232 so that it can freely rotate within the socket 232 in two DoFs, about each of two axes that are mutually orthogonal to each other, with one of the two axes remaining fixed relative to the base 236 of the gimbal mount 230. It may, optionally, be permitted to rotate about a third mutually orthogonal axis extending through the post 222. The base 236 is representative of a structure for mounting the gimbal on to the base 208, against which the first control member 202a may react.

A cap 238 that is connected with the post 222 extends over a spherically-shaped outer surface of the socket 232 and has a complementary, spherical inner surface. Pivoting of the post 222 moves the cap relative to the socket.

Although an inner surface of socket 232 can complement and support rotation of the ball 228, the ball 228 can, in alternative embodiments, be supported for rotation about one or both mutually orthogonal axes of rotation in other ways and by other means, including by one or more shafts or axles that support rotation of the ball 228 relative to the socket 232. In such an alternative embodiment, the ball 228 and inside surfaces of the socket 232 need not be spherical or complementary.

In some embodiments, the controller 202 can be configured to control a crewed aerial vehicle with distributed electric propulsion (with electrical power supplied by a battery and/or hybrid system), such as, for example, a piloted multirotor drone, with or without wings to generate additional lift. In such embodiments, the first control member 202a can include a spring-centered mechanism, as described in further detail herein, thereby providing translational control (e.g., subtle translation) along the X, Y, and Z axis, as well as rotational control (e.g., yaw), as described in various embodiments herein. Further, in some implementations, the wheels 204 can each control a separate thrust component (e.g., a pusher prop behind the piloted multirotor drone). For example, one thrust component can provide for levitation and orientation, and a second thrust component can provide for speed (e.g., a "go fast") control, e.g., once safe cruise altitude is achieved.

Figure 3A:
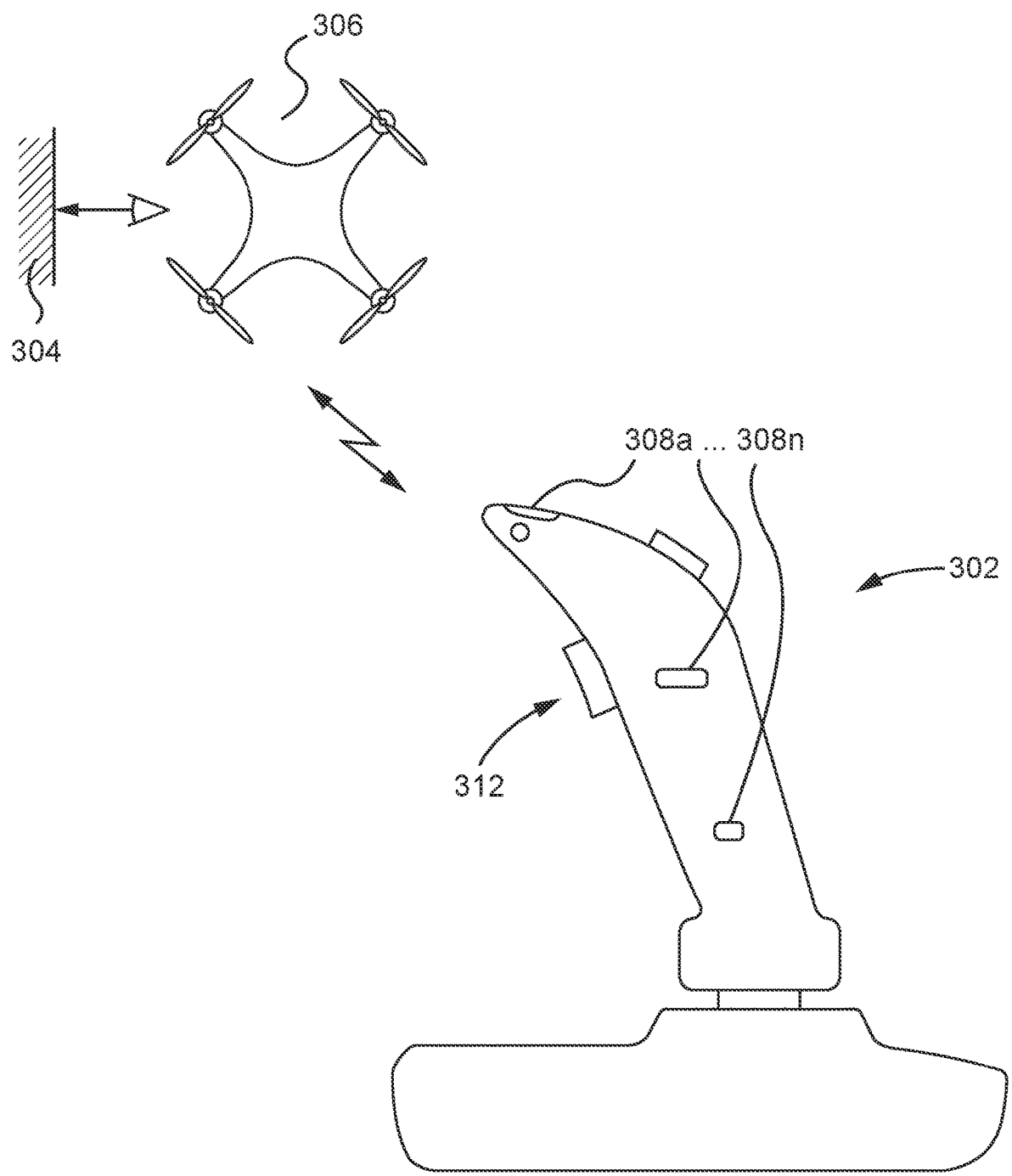
FIG. 3A is a schematic of a controller with a feedback system configured to communicate with a control target to receive feedback from the control target, according to an embodiment.
Figure 3B:
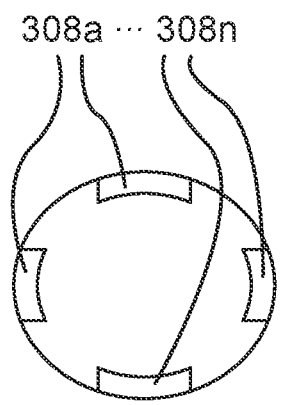
FIG. 3B is a cross-sectional top-view of the feedback system of the controller of FIG. 3A, according to an embodiment.

With reference to FIGS. 3A-B, in some embodiments, the control target 306 such as but not limited to remotely-piloted vehicles (e.g., "drones"), land-craft, aircraft (e.g., fixed-wing aircraft), watercraft, submersibles, space vehicles, rocketry, satellites, a surgical device, an assembly or industrial device, and/or the like may be equipped with detectors configured to sense objects 304 in the vicinity of the control target 306 and/or obstacles along the travel path of the control target 306. The detectors may be configured to detect still as well as moving objects that pose a risk of collision with the control target 306. For instance, the detectors may be configured to detect still objects that are within a specified radius of the control target 306. As another example, the detectors may be configured to detect moving objects that are within a specified radius of the control target and are traveling at greater than a given velocity. Examples of such detectors include light detecting and ranging (LIDAR) systems, radar, GPS (with reference to a MAP), ADS-B (for avoiding other aircraft), video (and associated video analytics).

In some implementations, to avoid collisions with the sensed objects or obstacles 304, the control target 306 may provide feedback to the controller 302 controlling the control target 306 regarding the presence and status of the sensed objects or obstacles 304. The detectors and/or other communication system operatively coupled to the control target 306 may transmit data to the controller 302 (e.g., to the transceiver 104a of the controller 302), the data including sensed object information such as but not limited to the distance of the sensed object 304 from the control target 306, the angular displacement of the sensed object 304 from the control target 306, the velocity of the sensed object 304 if the sensed object is in motion, and/or the like.

In some embodiments, the controller 302 may include a control module (not shown) (e.g., such as the control module 104c) configured to analyze the received data and generate signals configured to trigger, based on the result of the analysis, user feedback systems located within the controller 302. For example, the received data may include successive data including location information of a sensed object 304, and the analysis may determine the speed and direction of a sensed object or obstacle 304 approaching the control target 306. As another example, the received data may already include the information related to the speed and direction of the approach of the sensed object or obstacle 304. In such examples, the control module may trigger a feedback system of the controller 302 in a manner that informs the user of the controller 302 the direction (e.g., from the perspective of the control target 306) at which the sensed object or obstacle 304 is located or from which the sensed object or obstacle 304 is approaching, and/or the rate at which the sensed object or obstacle 304 is approaching the control target 306.

Figure 3C:
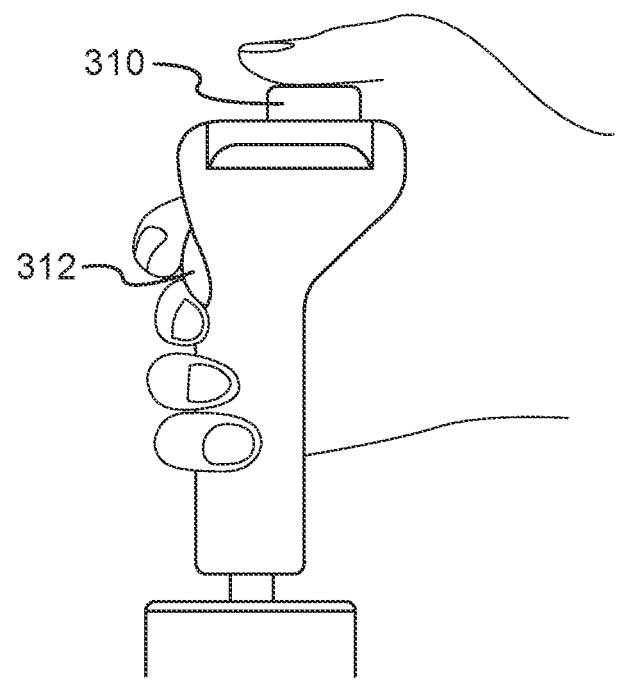
FIG. 3C is a side view of a schematic of a user handling the controller of FIG. 3A, according to an embodiment.

The manner in which the feedback system informs the user of the controller 302 information related to objects or obstacles 304 sensed by the control target 306 can depend on the feedback elements of the controller 302. In some implementations, the feedback may be in the form of haptic feedback, and the feedback elements of the controller 302 can be one or more vibration haptic motors 308a-308n located or positioned on or within the controller 302 (e.g., two, three, four, five, six, seven, eight, etc., vibration haptic motors 308a-308n). In such implementations, the control module of the controller 302 may generate signals that are configured to cause the vibration haptic motors 308a-308n of the controller vibrate according to a pre-defined relationship between the pattern of vibration of the vibration haptic motors 308a-308n and information related to the sensed objects or obstacles 304. For example, the rate of vibration of the vibration haptic motors 308a-308n may be related to the distance of the sensed objects or obstacles 304. As such, for sensed objects or obstacles 304 that are in motion and approaching the control target 306, the control module may generate signals that increase the rate of vibration of the vibration haptic motors 308a-308n (e.g., this can occur in real-time or nearly real-time as the data is continuously or substantially continuously sent from the control target 306 to the controller 302). As another example, the pre-defined relationship between the pattern of vibration of the vibration haptic motors 308a-308n and information related to the sensed objects or obstacles 304 may inform which one(s) of the vibration haptic motors 308a-308n may vibrate depending on the information. For instance, if the information indicates that the sensed object or obstacle 304 is approaching the control target 306 from the right side of the control target 306, the control module may generate a signal that causes the vibration haptic motor that is on the right side of the controller to vibrate. FIG. 3B shows a top cross-sectional view of an example distribution of vibration haptic motors 308a-308n within the controller 302. In such embodiment, the "right" vibration haptic motor, which is closest to the palm of a user handling the controller (e.g., FIG. 3C), may vibrate, indicating or informing the user that the control target 306 is being approached by an object or obstacle from the right side of the control target 306.

As noted above, the vibration haptic motors 308a-308n may be located within the controller 302. In some implementations, one or more of the vibration haptic motors 308a-308n may be part of or integral to other features of the controller 302. For example, the controller 302 may include a thumb saddle 310 for resting a thumb of a user handling the controller (e.g., FIG. 3C), and one or more of the vibration haptic motors 308a-308n may be integral to the thumb saddle 310. As another example, the controller 302 may include a control button 312 (e.g., such as but not limited to the trim control 202e), and one or more of the vibration haptic motors 308a-308n may be integral to the control button 312.

In some embodiments, each of the vibration haptic motors 308a-308n can be vibrationally isolated with vibration absorbent materials, thus allowing for discrete vibration signals to be transferred to the hand grip of the controller 302. In so doing, the pilot or operator is given spatially distinct feedback, e.g., an approaching aircraft on the left side, etc.

In some embodiments, instead of or in addition to vibration feedback, the feedback may include visual feedback, and the feedback elements of the controller 302 can be one or more light sources (not shown) such as but not limited to LEDs, etc., located on the controller 302 and configured to illuminate in response to the signals from the control module. For example, the control module of the controller 302 may generate signals that are configured to cause the light sources to light up according to a pre-defined relationship between the pattern of illumination of the light sources and information related to the sensed objects or obstacles 304. For instance, the pattern, intensity and/or order of illumination of the light sources may be related to the distance of the sensed objects or obstacles 304 and/or the rate at which the sensed objects or obstacles 304 are approaching the control target 306. As an illustrative example, for sensed objects or obstacles 304 that are in motion and approaching the control target 306, the control module may generate signals that cause the light sources to increase the intensity or their illumination and/or blink rate (e.g., this can occur in real-time or nearly real-time as the data is continuously or substantially continuously sent from the control target 306 to the controller 302). As another example, the pre-defined relationship between the pattern of illumination of the light sources and information related to the sensed objects or obstacles 304 may inform which one(s) of the light sources may vibrate depending on the information. For instance, if the information indicates that the sensed object or obstacle 304 is approaching the control target 306 from the left side of the control target 306, the control module may generate a signal that causes the light sources on the left side of the controller to light up, while the light sources in the middle and the right side are off.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A controller, comprising:
    a first control member configured to be movable back and forth through three continuous and independent degrees of freedom to provide in response thereto a corresponding set of three independent control inputs;
    a second control member being a wheel and positioned on the first control member and configured to rotate back and forth in a single degree of freedom relative to the first control member to provide in response thereto a corresponding fourth control input, the wheel being associated with two or more throttle settings;
    a tension tuner configured to regulate responsiveness of the wheel by varying friction experienced by the wheel when rotating back and forth relative to the first control member to provide the corresponding fourth control input, wherein the responsiveness of the wheel indicates an amount of force applied to the wheel to produce a given amount of speed for a control target
    a controller processor configured to receive the set of three independent control inputs and the fourth control input and generate a set of first control signals and a second control signal, respectively,
        the set of first control signals configured to control three independent rotational movements of the control target; and
        the second control signal configured to control vertical movement of the control target wherein the controller processor is configured to:
receive feedback from the control target based on sensory measurements procured by the control target, wherein the sensory measurements include at least a distance of a sensed object from the control target, and an angular displacement of the sensed object from the control target;
analyze the received feedback and generate signals configured to trigger, based on a result of the analysis, a user feedback system associated with the controller processor, wherein the user feedback system includes a plurality of vibration haptic motors located within the controller, and wherein a particular one of the plurality of vibration haptic motors is activated based on the distance and the angular displacement of the sensed object to the control target.

2. The controller of claim 1, wherein the control target is a fixed-wing aircraft, an electric, hybrid, and/or combustion powered aircraft, a remotely operated vehicle (ROV), a crewed aerial vehicle with distributed electric propulsion, a crewed submersible, a spacecraft, or a virtual craft.

3. The controller of claim 1, further comprising a discrete control element configured to provide discrete control input including a trim function.

4. The controller of claim 1, wherein the two or more throttle settings include a first throttle setting, a second throttle setting, and a third throttle setting, the controller further comprising a safety mechanism that is, when engaged, configured to prevent the wheel from changing from the first throttle setting to the second throttle setting, while allowing the wheel to change from the first throttle setting to the third throttle setting.

5. The controller of claim 4, wherein the first throttle setting is a movement setting, the second throttle setting is an off setting, and the third throttle setting is an idle setting.

6. The controller of claim 4, wherein the safety mechanism is a ball plunger that is configured to be depressed for the safety mechanism to allow the wheel to rotate when a force is applied on the wheel.

7. The controller of claim 1, wherein:
the control target is a crewed aerial vehicle with distributed electric propulsion; and
the first control member includes a spring-centered mechanism configured to provide translational control and rotational control.

8. The controller of claim 1, wherein:
the control target is a fixed-wing aircraft; and
movement forward or aft relative to a longitudinal axis of the first control member is configured to generate longitudinal movement of the control target.

9. The controller of claim 1, wherein the controller is onboard the control target while controlling the control target.

10. The controller of claim 1, wherein the plurality of the vibration haptic motors includes at least a right vibration haptic motor disposed on a right side of the controller and a left vibration haptic motor disposed on a left side of the controller, and wherein the controller processor is further configured to activate:
the right vibration haptic motor based on the distance and when the angular displacement of the sensed object indicates that the sensed object is approaching the control target from the right; and
the left vibration haptic motor based on the distance and when the angular displacement of the sensed object indicates that the sensed object is approaching the control target from the left.

11. The controller of claim 10, wherein the controller processor is configured to activate the right vibration haptic motor and not the left vibration haptic motor, when the indication is that the sensed object is approaching the control target from the right, and activate the left vibration haptic motor and not the right vibration haptic motor, when the indication is that the sensed object is approaching the control target from the left.

12. The controller of claim 1, wherein the controller processor is further configured to send a signal to the plurality of vibration haptic motors to increase frequency of vibration as the distance decreases.

13. The controller of claim 1, wherein the controller processor is further configured to send a signal to the plurality of vibration haptic motors to change a frequency of vibration based on a rate at which the distance between the sensed object and the control target is changing.

14. The controller of claim 13, wherein the plurality of vibration haptic motors includes at least a left vibration haptic motor located at a left side of the controller, a right vibration haptic motor located at a right side of the controller, a front vibration haptic motor located at a front side of the controller and a back vibration haptic motor located at a back side of the controller.

15. The controller of claim 1, wherein, each one of the plurality of vibration haptic motors is vibrationally isolated from any other one of the plurality of vibration haptic motors, and wherein the vibrational isolation is achieved via vibration absorbent materials disposed between each vibration haptic motor from the plurality of vibration haptic motors.

16. The controller of claim 1, wherein the second control member further includes a thumb saddle, and wherein at least one of the plurality of vibration haptic motors is disposed within the thumb saddle.

17. The controller of claim 1, wherein the controller further includes a control button located in a front portion of the controller, and wherein at least one of the plurality of vibration haptic motors is disposed within the control button.

18. The controller of claim 1, wherein the sensory measurements further include at least a measurement of a velocity of the sensed object.

19. The controller of claim 1, wherein the user feedback system further includes a plurality of light emitting diodes (LEDs) integrated with the controller and configured to illuminate based on the distance and the angular displacement of the sensed object from the control target.

20. The controller of claim 19, wherein the controller processor is further configured to increase at least one of illumination intensity or a blink rate of at least one LED from the plurality of LEDs as the distance of the sensed object to the control target decreases.

21. The controller of claim 20, wherein the plurality of LEDs include a right LED disposed on a right side of the controller and a left LED disposed on a left side of the controller, and wherein the controller processor is further configured to activate:
the right LED when the angular displacement of the sensed object indicates that the sensed object is approaching the control target from the right; and
the left LED when the angular displacement of the sensed object indicates that the sensed object is approaching the control target from the left.

22. The controller of claim 21, wherein the controller processor is further configured to selectively activate the right LED and not the left LED, or the left LED and not the right LED, based on a direction from which the control target is approaching the sensed object.

23. The controller of claim 1, wherein the tension tuner includes a range of values, such that for each value in the range of values, a user needs to apply a value-specific amount of force to the wheel to produce the given amount of speed for the control target.

24. A controller for controlling a control target having a plurality of engines, the controller comprising:
 a first control member configured to be movable back and forth through three continuous and independent degrees of freedom to provide in response thereto a corresponding set of three independent control inputs;
 a second control member being a wheel and positioned on the first control member and configured to rotate back and forth in a single degree of freedom relative to the first control member to provide in response thereto a corresponding fourth control input,
 wherein the first control member includes a plurality of other wheels, each of the plurality of other wheels being configured to control an associated engine from the plurality of engines of the control target, each of the plurality of other wheels being associated with a first throttle setting, a second throttle setting, and a third throttle setting;
 a safety mechanism that is, when engaged, configured to prevent at least one wheel from the plurality of other wheels from changing from the first throttle setting to the second throttle setting, while allowing the at least one wheel from the plurality of other wheels to change from the first throttle setting to the third throttle setting;
 a synchronicity control element configured to activate or deactivate a synchronization of rotations of the plurality of other wheels, wherein the synchronization causes the plurality of other wheels to rotate in a substantially similar manner, when any one wheel of the plurality of other wheels is controlled by a user by applying a force to that wheel; and
 a controller processor configured to receive the set of three independent control inputs and the forth control input and generate a set of first control signals and a second control signal, respectively,
  the set of first control signals configured to control three independent rotational movements of a control target; and
  the second control signal configured to control vertical movement of the control target.

25. The controller of claim 24, wherein the synchronicity control element is configured to allow a substantially precise adjustment of the first throttle setting, the second throttle setting, and the third throttle setting.

26. The controller of claim 24, wherein the safety mechanism is a first safety mechanism, the controller further comprising a second safety mechanism,
the second safety mechanism being associated with another wheel from the plurality of other wheels, and configured to prevent that wheel from changing between the first throttle setting to the second throttle setting.

27. The controller of claim 26, wherein the first safety mechanism and the second safety mechanism are configured to prevent abrupt shutoff of a motor controlled by a wheel associated with that safety mechanism.

28. A controller, comprising:
 a first control member configured to be movable back and forth through three continuous and independent degrees of freedom to provide in response thereto a corresponding set of three independent control inputs;
 a second control member including a wheel and positioned on the first control member and configured to rotate back and forth in a single degree of freedom relative to the first control member to provide in response thereto a corresponding fourth control input, the wheel being associated with a plurality of throttle settings inclusive of a first throttle setting, a second throttle setting, and a third throttle setting;
 a safety mechanism that is, when engaged, configured to prevent the wheel from changing from the first throttle setting to the second throttle setting, while allowing the wheel to change from the first throttle setting to the third throttle setting; and
 a controller processor configured to receive the set of three independent control inputs and the fourth control input and generate a set of first control signals and a second control signal, respectively,
  the set of first control signals configured to control three independent rotational movements of a control target; and
  the second control signal configured to control vertical movement of the control target.

29. The controller of claim 28, further comprising a tension tuner configured to regulate responsiveness of the wheel by varying friction experienced by the wheel when rotating back and forth relative to the first control member to provide the corresponding fourth control input, wherein the responsiveness of the wheel indicates an amount of force applied to the wheel to produce a given amount of speed for the control target.

30. The controller of claim 28, wherein the first control member includes a plurality of other wheels, each of the plurality of other wheels being configured to control an associated engine from a plurality of engines of the control target, each of the plurality of other wheels being associated with the first throttle setting, the second throttle setting, and the third throttle setting.

* * * * *